United States Patent
Lynch et al.

(10) Patent No.: US 11,595,789 B2
(45) Date of Patent: Feb. 28, 2023

(54) MISSED COMMUNICATION NOTIFICATION

(71) Applicant: Apple Inc., Cupertino, CA (US)

(72) Inventors: Kevin M. Lynch, Woodside, CA (US); Albert Riley Howard, Sunnyvale, CA (US); Ryan A. Williams, Sunnyvale, CA (US); Nicholas J. Circosta, Mountain View, CA (US); Andreas E. Schobel, San Francisco, CA (US); Thomas Chathoth Abraham, San Francisco, CA (US); Vibhor Goyal, Dublin, CA (US); Christopher P. Saari, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/888,544

(22) Filed: May 29, 2020

(65) Prior Publication Data
US 2020/0382916 A1 Dec. 3, 2020

Related U.S. Application Data

(60) Provisional application No. 62/855,868, filed on May 31, 2019.

(51) Int. Cl.
*H04W 4/12* (2009.01)
*H04W 68/00* (2009.01)
*H04W 12/033* (2021.01)

(52) U.S. Cl.
CPC ........... *H04W 4/12* (2013.01); *H04W 12/033* (2021.01); *H04W 68/005* (2013.01)

(58) Field of Classification Search
CPC ........... H04W 4/12; H04W 4/16; H04W 4/70; H04W 12/0033; H04W 68/005; H04M 2203/2011; H04M 2203/2016; H04M 2203/2027; H04M 2203/551; H04M 3/42195; H04M 1/2563; H04M 3/42008; H04M 3/2281; H04M 3/436
See application file for complete search history.

(56) References Cited

U.S. PATENT DOCUMENTS

| | | | |
|---|---|---|---|
| 8,805,346 B1 * | 8/2014 | Zhang | H04M 3/5322 455/414.1 |
| 9,123,232 B1 * | 9/2015 | Chan | G08B 21/22 |
| 9,646,628 B1 * | 5/2017 | Carlson | G10L 17/00 |
| 2008/0207184 A1 * | 8/2008 | Wassingbo | H04M 3/42212 370/352 |

(Continued)

*Primary Examiner* — Jean A Gelin
(74) *Attorney, Agent, or Firm* — BakerHostetler

(57) ABSTRACT

A device implementing a system for missed communication notification may include at least one processor configured to receive, from a server over a first communication channel, a message indicating that another device initiated a communication with the device over a second communication channel at a particular time. The at least one processor may be further configured to determine, by the device, whether the communication was established with the other device over the second communication channel at the particular time. The at least one processor may be further configured to provide, for display, an indication of the message based at least in part on a determination that the communication initiated by the other device was not established over the second communication channel at the particular time.

20 Claims, 4 Drawing Sheets

(56) References Cited

U.S. PATENT DOCUMENTS

| | | | |
|---|---|---|---|
| 2009/0017802 A1* | 1/2009 | Zhang | H04W 4/16 |
| | | | 455/445 |
| 2011/0014870 A1* | 1/2011 | Koraichi | H04W 12/041 |
| | | | 455/41.2 |
| 2012/0314663 A1* | 12/2012 | Dwivedi | H04L 1/1893 |
| | | | 370/329 |
| 2013/0189925 A1* | 7/2013 | Staskawicz | H04W 4/80 |
| | | | 455/41.1 |
| 2013/0246203 A1* | 9/2013 | Laracey | G06Q 20/108 |
| | | | 705/40 |
| 2014/0080465 A1* | 3/2014 | Cho | H04M 1/724 |
| | | | 455/566 |
| 2014/0295807 A1* | 10/2014 | Li | H04M 3/42195 |
| | | | 455/414.1 |
| 2015/0271163 A1* | 9/2015 | Greenspan | H04L 63/18 |
| | | | 713/168 |
| 2016/0099920 A1* | 4/2016 | Meuleman | H04L 63/18 |
| | | | 713/153 |
| 2016/0316330 A1* | 10/2016 | Wang | H04L 63/104 |
| 2016/0344865 A1* | 11/2016 | Ehlen | H04M 3/42195 |
| 2017/0013470 A1* | 1/2017 | Sun | H04W 16/14 |
| 2017/0126897 A1* | 5/2017 | Fransson | H04M 7/0006 |
| 2018/0192460 A1* | 7/2018 | Huh | H04W 92/18 |
| 2018/0227273 A1* | 8/2018 | Shumsker | H04L 67/12 |
| 2020/0258306 A1* | 8/2020 | Forutanpour | G01S 5/16 |
| 2021/0250836 A1* | 8/2021 | Chen | H04W 36/00 |

\* cited by examiner

MISSED COMMUNICATION NOTIFICATION

CROSS REFERENCE TO RELATED APPLICATIONS

This application claims the benefit of priority to U.S. Provisional Patent Application No. 62/855,868, entitled "Missed Communication Notification," and filed on May 31, 2019, the disclosure of which is hereby incorporated herein in its entirety.

TECHNICAL FIELD

The present description relates generally to wireless communications between electronic devices, and more particularly to notifications of missed communications, such as notifications of missed calls.

BACKGROUND

If a user attempts to call a mobile device of another user while the other user is out of service range, has their mobile device turned off, and/or has their mobile device in airplane mode, the other user may not be aware of the attempted call.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A wireless communication device (e.g., watch, smartphone, etc.) that is an intended recipient of an audio and/or video communication (e.g., call) and is out of service range (and/or is powered off/in airplane mode) would neither receive the communication nor have knowledge that a calling party attempted to initiate the communication while the device was out of range or in an unavailable mode (e.g., powered off and/or in airplane mode). The subject system notifies an intended recipient device that an attempted audio and/or video communication was missed by transmitting a notification to the intended recipient device when the device is back within service range of a network (e.g., Cellular, WiFi).

In one or more implementations, this can be achieved by transmitting a corresponding data message (e.g., notification) to the intended recipient device contemporaneous with initiating an audio and/or video communication with the intended recipient device. If the audio and/or video communication is received by the intended recipient device, then the intended recipient device can discard the corresponding data message when received. Otherwise, the data message is delivered to the intended recipient device as a notification of the missed call when the intended recipient device is back within service range of a network. In one or more implementations, the data messages can be suppressed and/or filtered at the intended recipient device to show missed communications from only calling users on a contact list or in an authorized group of users.

Figure 1:
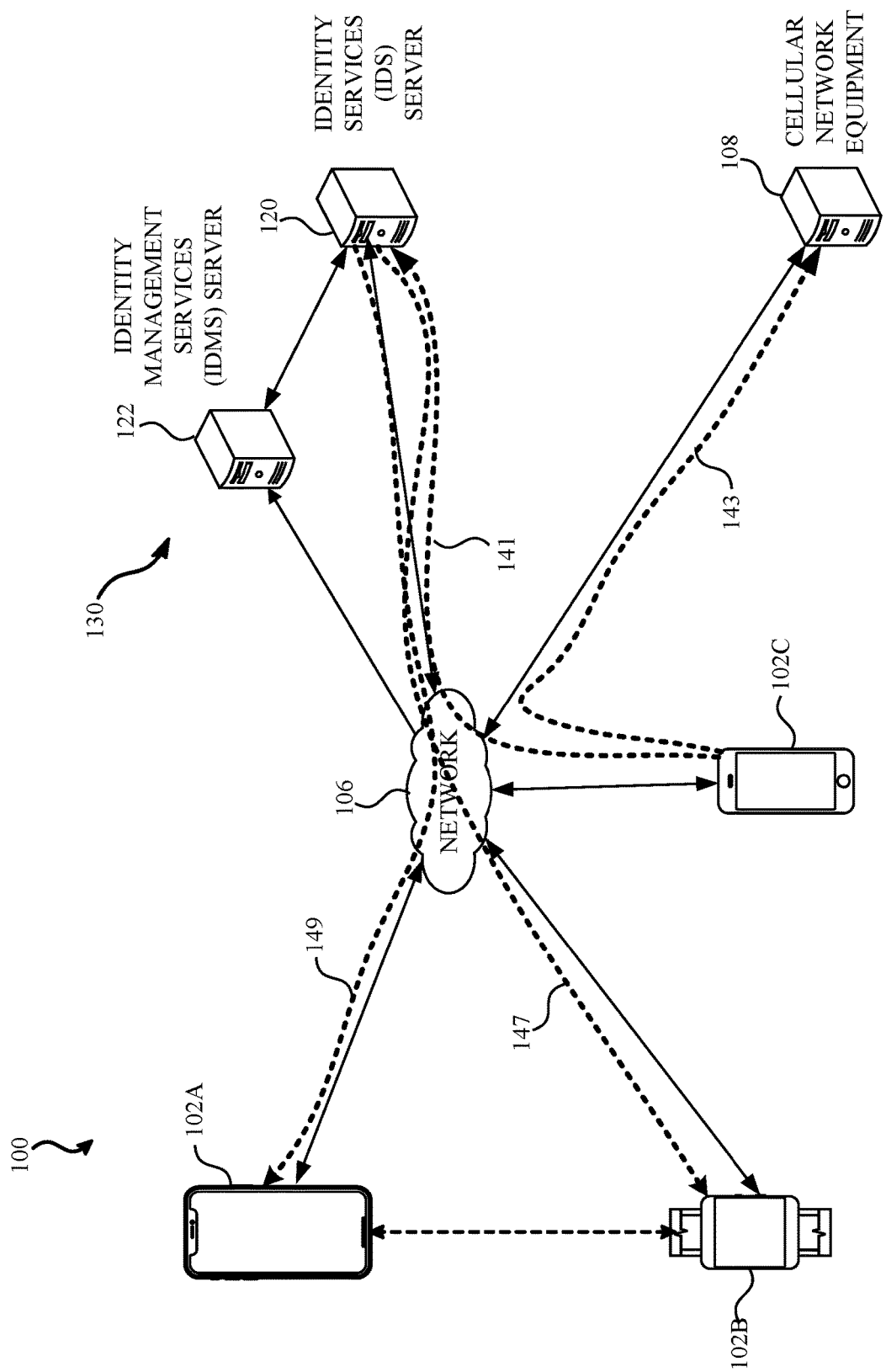
FIG. 1 illustrates an example network environment in which a missed communication notification system may be implemented in accordance with one or more implementations.

FIG. 1 illustrates an example network environment 100 in which a missed communication notification system may be implemented in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes one or more electronic devices 102A-C, a network 106, cellular network equipment 108, an identity services (IDS) server 120, and an identity management services (IDMS) server 122. The cellular network equipment 108 may include any of, for example, one or more access networks, a core network, application servers, media servers, base stations, IP multimedia subsystem (IMS) servers, and the like. The cellular network equipment 108 may be physically or logically associated with a particular cellular carrier, and/or the cellular network equipment may span multiple different cellular carriers.

The network 106 may be an interconnected network of devices that may include, or may be communicatively coupled to, the Internet. The network 106 may communicatively (directly or indirectly) couple, for example, any two or more of the electronic devices 102A-C, the servers 120, 122, and/or the cellular network equipment 108. The network 106 may communicatively (directly or indirectly) couple, for example, the electronic device 102C with the IDMS server 122, the cellular network equipment 108, and/or the IDS server 120. In one or more implementations, the network 106 may include all or part of the cellular network equipment 108. In one or more implementations, connections over the network 106, and/or connections utilizing the cellular network equipment 108, may be referred to as wide area network connections, while connections between two or more of the electronic devices 102A-C, may be referred to as peer-to-peer connections.

One or more of the electronic devices 102A-C may be, for example, a portable computing device such as a laptop computer, a smartphone, a peripheral device (e.g., a digital camera, headphones), a tablet device, a wearable device such as a watch, a band, and the like, or any other appropriate device that includes one or more wireless interfaces, such as one or more near-field communication (NFC) radios, WLAN radios, Bluetooth radios, Zigbee radios, cellular radios, and/or other wireless radios. In FIG. 1, by way of example, the electronic devices 102A,C are depicted as mobile phones and the electronic device 102B is depicted as a wearable device. One or more of the electronic devices 102A-C may be, and/or may include all or part of, the electronic system discussed below with respect to FIG. 4.

In one or more implementations, the electronic device 102B may be paired, such as via Bluetooth, with one or more of the electronic devices 102A or 102C. Two or more of the electronic devices 102A-C, such as the electronic devices 102A and 102C may also be paired together. After two of the devices 102A-C are paired together, the devices may automatically form a peer-to-peer connection when located proximate to one another, such as within Bluetooth communication range of one another.

For explanatory purposes, a communication session (or "call") is primarily described herein as being a cellular communication session, e.g. a cellular phone call. However, a communication session may be, for example, a video call, a Wi-Fi call, a VoIP call, an intercom call, a push-to-talk (PTT) call, a D2D call, or generally any communication between two or more of the electronic devices 102A-C.

In some implementations, a secured communication channel may be established between two or more of the electronic devices 102A, 102B or 102C via the IDS server 120, such as by using end-to-end encryption, such that a message and/or a notification can traverse the secured channel to its destination independent of a cellular communication session being established. For example, the electronic device 102C may intend to place an audio and/or video call to the electronic device 102A by establishing a communication session with the electronic device 102A through the cellular network equipment 108. However, the electronic device 102A may be out of service range or in an unavailable mode (e.g., airplane mode), and thus the electronic device 102A would neither receive the call nor have knowledge that the electronic device 102C attempted to call while the electronic device 102A was out of range.

IDMS server 122 can be implemented in various examples using a single server computer system or can include multiple server computer systems, web servers, application servers, networks, interconnects, and the like. In various aspects, IDMS server 122 can provide management of individual entities, their authentication, authorization, and privileges within or across systems. Identity management services provided by IDMS server 122 can include technologies and services such as Active Directory, identity providers, password managers, access control providers, single sign-on (SSO) services, OAuth security token services, or the like.

In some implementations, IDMS server 122 can maintain information that authenticates the identity of a managed entity (such as a user, organization, and any associated devices, resources, services, applications, or the like). IDMS server 122 can verify that an entity is who/what it claims to be using a password, biometrics such as a fingerprint, a distinctive behavior such as a gesture pattern on a touchscreen, challenge-response protocols, one-time passwords (OTPs), 2-way authentications, and other techniques.

The IDS server 120 and/or the IDMS server 122 may form all or part of a network of computers, such as in a cloud computing or data center implementation. In an example, the IDS server 120 and/or the IDMS server 122, may be associated with a particular service provider or entity, e.g. different from the cellular network equipment 108. Moreover, the IDS server 120 can be combined with the IDMS server 122 in at least an implementation, and/or one or more of the IDS server 120 or the IDMS server 122 may not be included in one or more implementations.

In some implementations, electronic device 102A, electronic device 102B, and electronic device 102C can host one or more of a variety of client applications that communicate with one or more server applications provided by one or more providers. These client applications can include applications specific to the intended function of a device (such as telephony applications or GPS applications) as well as e-mail clients, update/upgrade clients, news clients, web/blog clients, podcast clients, social networking clients, or other types of client applications where notification messages can be sent. These client applications can present to a user one or more notification messages received using IDS server 120. Notifications can be presented to users in one or more manners defined by an operating system of the device, a graphical user interface toolkit, and/or the applications themselves. Some examples of representations of notifications may include an e-mail indicator, a news item indicator, a podcast indicator, a change of on-line status of a social networking friend, and the like. In some implementations, another service operating on a device can handle notifications for client applications.

In some implementations, the content sent to electronic device 102B can be forwarded to electronic device 102A for delivery to electronic device 102B. Electronic device 102A can also act and send signals on behalf of electronic device 102B. In some implementations, electronic device 102A can function as a main or intermediary device and electronic device 102B can function as a proxied device.

In some implementations, cellular network equipment 108, such as an IMS server, can route incoming communications to more than one device, when appropriate. For example, both electronic device 102A and electronic device 102B may be associated with the same user account. The cellular network equipment 108 can route incoming communications to both electronic device 102A and electronic device 102B, such as to have a cellular phone call ring on both devices. In some implementations, communications can be routed to only one device (e.g., to electronic device 102A), which can forward the communication to electronic device 102B.

An alert can be sent to one or more of electronic device 102A, electronic device 102B, or electronic device 102C, which can come in a variety of forms. In some implementations, content can be displayed to a user as an alert message or other visual representation, such as a badge associated with an application icon. Availability of the content can be announced by playing a sound when an alert or badge is shown. When a user is notified that an application or service has a message, event, or other content data for them, they can launch the application or service and see the details by either viewing the content, viewing information contained in a push notification, having the client application retrieve the referenced information, or the like. The user can also choose to ignore the notification, in which case the application is not activated.

The IDS server 120 can include a push notification messaging service to transmit buffered messages, such as messages pertaining to missed calls, to an intended recipient device when the intended recipient device is back online (or back in range of service). IDMS server 122 can ensure that the electronic device 102C is authenticated (i.e., that the electronic device 102C is who the electronic device 102C alleges to be) and authorized to connect and utilizes IDS server 120 in a trusted manner.

The electronic device 102A, electronic device 102B, and electronic device 102C can receive an identifier (or device token) when a client application initially connects with IDS server 120 in order to receive push notifications. In some implementations, to ensure trust, a provider communicates the token when it connects with IDS server 120. The IDS server 120 can decrypt the device token and validate using IDMS server 122 that the token was generated for the destination device. To validate, IDS server 120 can ensure that the device identifier contained in the token matches the device identifier in a device certificate used when the device registered with IDMS server 122.

In some implementations, one or more server computers can provide, provision, manage, and otherwise operate the push notification messaging service for propagating information between electronic device 102A, electronic device 102B, and electronic device 102C. Each may establish at least one persistent connection (e.g., an accredited and encrypted Internet protocol (IP) connection) with IDS server 120 to originate and/or receive messages over this persistent connection. As noted above, each of their connections can be authenticated and authorized by IDMS server 122.

The subject system may utilize the push notification messaging service to facilitate notifying an intended recipient device, such as the electronic device 102A, that it missed an audio and/or video call by providing buffered notifications to the electronic device 102A when the electronic device 102A is back within service range of the network 106 (e.g., Cellular, WiFi). In some aspects, the electronic device 102C may generate and send a data message to the electronic device 102A, such as via the IDS server 120, substantially contemporaneous with initiating an audio and/or video call with the electronic device 102A, such as via the cellular network equipment 108. If the call is received by the electronic device 102A, then the delivered data message may be purged by the electronic device 102C when received. However, if the audio and/or video call to the electronic device 102A cannot be established, the data message delivered to the electronic device 102A through the secured communication channel serves as a notification of the missed call when the electronic device 102A is back online.

While the electronic device 102C is initiating a communication session with the electronic device 102A via the cellular network equipment 108 illustrated by path 143, for example, the electronic device 102C can generate and send a message (e.g., a missed communication notification) through a secure channel connection to the IDS server 120 (hereinafter referred to as "IDS channel") illustrated by path 141, which can push the message to a destination target device, such as the electronic device 102A. In one or more implementations, the message may be end-to-end encrypted between the electronic device 102C and the electronic device 102A, such that the IDS server 120 cannot access the contents of the message. Although a secure channel within IDS is described as the communication channel between the two devices, namely the electronic device 102C and the electronic device 102A, it should be understood that other suitable communication channels/services can also be used for performing the same tasks.

In some implementations, the missed call notification service is made available to a source device that is associated with a list of trusted users for which the missed call notification message system will be activated, e.g. that the missed call notification service can be discretely activated for only users on a list of trusted users with respect to the intended recipient device (e.g., parents, babysitter, school, etc.). In an example, the electronic device 102C may access the list of trusted users and determine that the user of the electronic device 102A and/or a device identifier of the electronic device 102A are identified among the list of trusted users, and therefore, the missed call notification is sent to the electronic device 102A through the IDS channel.

In one or more implementations, the electronic device 102C may initiate a communication session with the electronic device 102B via the cellular network equipment 108, concurrently with transmitting a message to the electronic device 102C through a secure communication channel connection to IDS server 120. IDMS server 122 can also ensure that the destination target device is authenticated and authorized to connect to and utilize services of the IDS server 120 in a trusted manner. A destination target device can refer to an entity designated to receive information forwarded and/or delivered using the IDS server 120.

The IDS server 120 can also provide a default quality-of-service (QoS) component that provides store-and-forward capabilities. If IDS server 120 attempts to deliver a message but a target device is offline, the message can be stored for a limited period of time, and delivered to the device when it becomes available (or back in service range). In some implementations, all recent messages for a particular target device are stored until delivered to the target device. In other examples, if the device remains offline for an extended period of time, any messages that were stored for more than a threshold amount of time may be discarded.

If the destination device is online, IDS server 120 can route the notification message to the destination target device (e.g., the electronic device 102A) illustrated by path 149, for example, via a persistent connection maintained by the electronic device 102A with IDS server 120. If the destination is "offline" or otherwise inaccessible to IDS server 120, the notification message can be stored and delivered to the electronic device 102A upon detecting that the electronic device 102A is back online. The IDS server 120 can route content to a single device, multiple devices at the same time, or to one device for delivery to another device. For example, the IDS server 120 can route the notification message to the electronic device 102B via a persistent connection maintained by the electronic device 102A with the IDS server 120. In other aspects, the notification message can be routed directly to the electronic device 102B via a direct connection between the electronic device 102B and the IDS server 120 illustrated by path 147, for example.

In some implementations, the IDS server 120 can determine whether the destination device (e.g., the electronic device 102A) is available (or within service range) to receive a missed call notification. In some examples, devices can lose their connection with the IDS server 120 for various reasons. For example, a connection might be lost due to loss of cellular signal, or WiFi signal, loss of power, or because a mobile device has changed geographic locations, etc. In some implementations, the IDS server 120 can determine the connection status of the destination device based on presence information.

In some implementations, presence information can be maintained using one or more push trigger notifications sent from the destination device when the destination device is back online. The push trigger notifications may indicate that the destination device is within service range (e.g., via Cellular and/or WiFi) and available to receive content (e.g., missed call notification). Accordingly, when an end-to-end encrypted message, such as a missed call notification, is received at the IDS server 120 directed to a particular destination device, the IDS server 120 can perform a lookup to determine whether there is a push trigger notification associated with that destination device. In some implementations, presence information can include mappings between authenticated entities and their connections to the IDS server 120. These connections can be utilized by the IDS server 120 for delivering content, notifications, and the like or otherwise communicating with an entity. Each mapping can be indicative of at least one entity and at least one connection mechanism to that entity. For example, a mapping can identify a destination device by its device token or a sending device by its source identifier.

The IDS server 120 can allow presence information to be generated when the IDS server 120 is connected to the intended recipient device (e.g., electronic device 102A, electronic device 102B). The intended recipient device can assert its presence to IDS server 120 by sending a single push trigger or a series of push triggers. Each of the push triggers serves as a notification to the IDS server 120 that the intended recipient device is online. The IDS server 120 can generate a device/connection mapping in the presence information.

Figure 2:
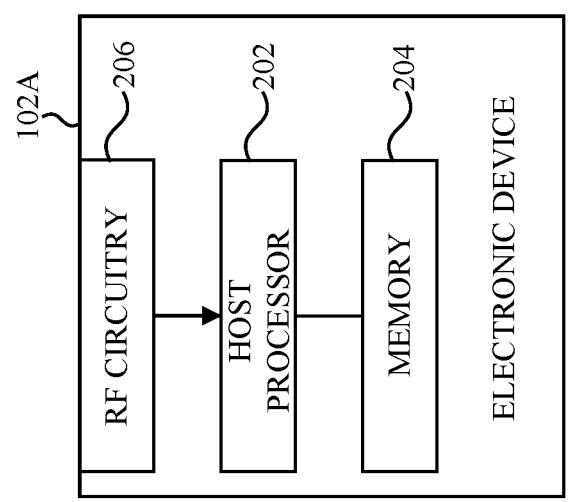
FIG. 2 illustrates an example electronic device that may implement a missed communication notification system in accordance with one or more implementations

FIG. 2 illustrates an example electronic device 102A that may implement a missed communication notification system in accordance with one or more implementations. The electronic device 102A is depicted in FIG. 2 for explanatory purposes; however, one or more of the components of the electronic device 102A may also be implemented by the other electronic devices 102B-C. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The electronic device 102A may include a host processor 202, a memory 204, and radio frequency (RF) circuitry 206. The RF circuitry 206 may include one or more antennas and one or more transceivers for transmitting/receiving RF communications, such as WiFi, Bluetooth, cellular, and the like. In one or more implementations, the RF circuitry 206 of the electronic device 102A may include circuitry for forming wide area network connections and peer-to-peer connections, such as WiFi, Bluetooth, and/or cellular circuitry.

The host processor 202 may include suitable logic, circuitry, and/or code that enable processing data and/or controlling operations of the electronic device 102. In this regard, the host processor 202 may be enabled to provide control signals to various other components of the electronic device 102A. Additionally, the host processor 202 may enable implementation of an operating system or may otherwise execute code to manage operations of the electronic device 102A. The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage.

In one or more implementations, one or more of the RF circuitry 206, the host processor 202, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
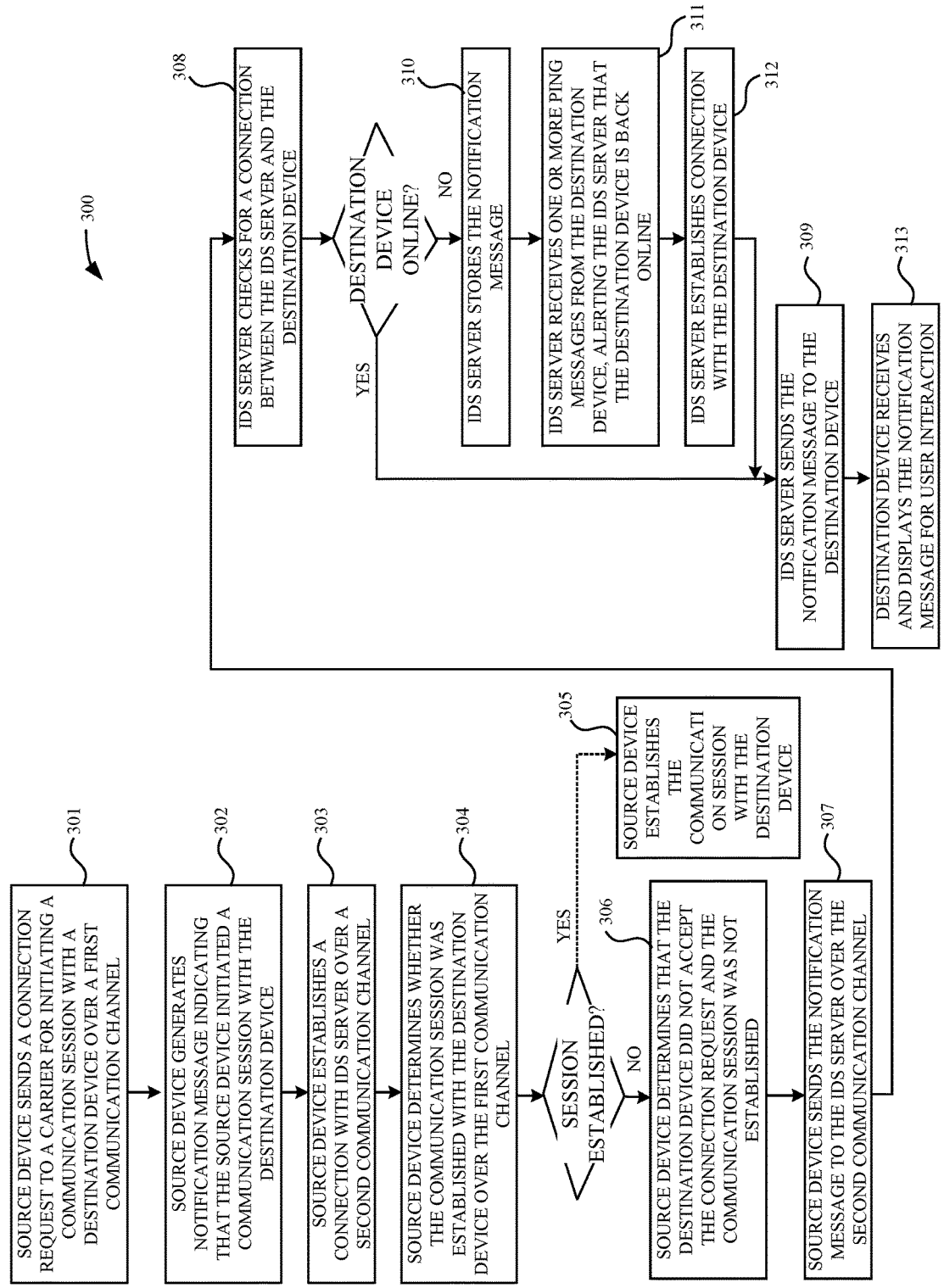
FIG. 3 illustrates a flow diagram of an example process for missed communication notification in accordance with one or more implementations.

FIG. 3 illustrates a flow diagram of an example process 300 for missed communication notification in accordance with one or more implementations. For explanatory purposes, the process 300 is primarily described herein with reference to the electronic devices 102A-C and IDS server 120 of FIG. 1. However, the process 300 is not limited to the electronic devices 102A-C and IDS server 120 of FIG. 1, and one or more blocks (or operations) of the process 300 may be performed by one or more other components of other suitable devices. Further for explanatory purposes, the blocks of the process 300 are described herein as occurring in serial, or linearly. However, multiple blocks of the process 300 may occur in parallel. In addition, the blocks of the process 300 need not be performed in the order shown and/or one or more blocks of the process 300 need not be performed and/or can be replaced by other operations.

The process 300 can begin at step 301, where a source device (e.g., the electronic device 102C) sends a connection request to a carrier (e.g., via the cellular network equipment 108) for initiating a communication session with a destination device (e.g., the electronic device 102A) over a first communication channel (e.g., Cellular communication channel illustrated by path 143) and through the network 106 at a particular time.

Next, at step 302, the source device generates a notification message, indicating that the source device initiated a communication session with the destination device via the cellular network equipment 108 over the first communication channel at the particular time. In some implementations, the step 302 is performed concurrently with the step 301. In some implementations, the missed call notification message system becomes available to a source device that is associated with a list of trusted users for which the notification message system will be activated, e.g. that the notification message system can be discretely activated for only users on a list of trusted users with respect to the intended recipient device (e.g., parents, babysitter, school, etc.).

Subsequently, at step 303, the source device establishes a connection with the IDS server 120 over a second communication channel (e.g., IDS channel illustrated by path 141) and through the network 106. In some aspects, the step 303 is performed concurrently with the step 301. The second communication channel provides end-to-end encryption for notification messages communicated between the source device and the destination device through the IDS server 120. For example, the source device may encrypt a notification message and may transmit the encrypted notification message to the destination device via the IDS server 120. The destination device may decrypt the received notification message to access the contents of the received notification message whereas the IDS server 120 may not be able to decrypt the encrypted notification message and/or access the contents of the encrypted notification message. The notification message may include a payload that includes, but is not limited to, a shared secret between the source device and the destination device so that the destination device can verify the notification message upon receipt, information about how many times the source device attempted to call (or establish a communication session) with the destination device, the type of communication service, an identifier of the caller (e.g., a user associated with the source device).

At step 303, certain information can be exchanged between the source device and the IDS server 120. The information can include identifier information of the destination device and a "heartbeat" interval of the source device.

The identifier information can be used by IDS server 120 to identify and monitor the status of the destination device. The heartbeat interval can be used by the IDS server 120 to keep the persistent or open connection with the source device from timing out. The heartbeat interval can indicate the time between these periodic updates. At step 303, the IDS server 120 can send an acknowledgement message to the source device. The acknowledgement message can indicate to the source device that the IDS server 120 is available to receive one or more messages.

Next, at step 304, the source device determines whether the communication session was established with the destination device over the first communication channel at the particular time. If the destination device receives the connection request through the cellular network equipment 108 and accepts the connection request, the process 300 proceeds to step 305. Otherwise, the process proceeds to step 306 to initiate the missed call notification service.

At step 305, the source device establishes the communication session with the destination device when the destination device receives the connection request via the cellular network equipment 108 and accepts the connection request. At step 305, the source device may discard the notification message responsive to the determination that the communication session initiated by the source device was not established with the destination device over the cellular communication channel at the particular time. In one or more implementations, the source device transmits the notification message substantially contemporaneous with initiating the communication session, irrespective of whether the communication session is established or not.

At step 306, the source device determines that the destination device did not receive the connection request and/or that the communication session was not established. In some examples, the carrier infrastructure may notify the source device of the results from the connection request. For example, the source device may receive a non-acknowledgment (NACK) from the cellular network equipment 108 indicating that the connection request was not successful. In other aspects, the cellular network equipment 108 may send an indication to the source device, indicating that the destination device does not have an IP multimedia subsystem (IMS) registration with the cellular network equipment 108. In this respect, the source device has knowledge that the destination device is offline (or unavailable) to accept and establish the communication session. In some implementations, the source device may receive an indication that the destination device received the request to accept the communication session from the source device and declined the request.

Subsequently, at step 307, the source device sends the notification message to the IDS server 120 over the second communication channel. In some aspects, at step 307, the source device can receive the non-acknowledgement message and can send the notification message to the IDS server 120 in response to the non-acknowledgement message. The notification message may include information, such as device association data, identifying which destination device (e.g., the electronic device 102A, the electronic device 102B) the IDS server 120 should send the notification message to. If the source device is associated with multiple sets of destination devices (e.g., the electronic device 102A, the electronic device 102B), then the IDS server 120 can analyze selection criteria associated with the source device to determine the appropriate set of one or more destination devices indicated in the device association data. In some examples, the device association data can be stored in another entity (e.g., database or registry), and the IDS server 120 can retrieve device association data from the other entity.

Also, at step 307, the source device can send an indication that the source device has one or more notification messages to be sent to one or more destination devices through the network 106, to the IDS server 120. In some examples, the indication that is sent by the source device can include the notification message. The indication sent from the source device to the IDS server 120 can include identification data that identifies the notification message. Alternatively or additionally, the IDS server 120 can create the identification data for the notification message. The identification data for the notification message can be based on one or more criteria, such as the message name, an identity (e.g., name) of the source device, date and time that the notification message was created and/or date and time the indication was received at the IDS server 120. In some implementations, the indication may include priority information that prioritizes each of the one or more notification messages. The IDS server 120 may store the notification messages into a priority queue according to the priority information. In this respect, the IDS server 120 may send each notification message in a particular order to the destination device from the priority queue.

Next, at step 308, the IDS server 120 can check for a connection between the IDS server 120 and the destination device. If a connection between the IDS server 120 and the destination device does exist, the process 300 proceeds to step 309. Otherwise, the process 300 proceeds to step 310 to initiate a storage operation of the notification message at the IDS server 120. At step 309, the IDS server 120 sends the notification message to the destination device.

At step 310, the IDS server 120 stores the notification message. In some examples, the IDS server 120 can store the notification message in its own local memory. In some examples, a third-party storage server can be used to store the notification message. In such situations, the IDS server 120 can generate and send storage location data corresponding to the third-party storage server to the source device.

At step 311, the destination device can send one or more ping messages to the IDS server 120, alerting the IDS server 120 that the destination device is back online and available to receive messages. In this respect, the ping messages may indicate that the destination device has at least a data connection to a network (e.g., Cellular, WiFi, or the like). Before, after, or concurrently, the destination device can establish a connection with the IDS server 120 through the network 106, and/or the cellular network equipment 108, over the second communication channel (e.g., IDS channel illustrated by path 149). In some aspects, the destination device sends the ping messages on a periodic basis. In some implementations, the destination device can ping other trusted devices (or source devices) through the IDS server 120 to notify these source devices of when the destination device is back online. These notifications to the other source devices can be sent on the second communication channel (e.g., the IDS channel) in some implementations, or on an existing data communication channel through the network 106 (independent of the IDS server 120) in other implementations.

In some examples, a possible trigger for the performance of step 311 can be the establishment of a connection between the destination device and the IDS server 120. For example, the destination device can be a WiFi-enabled smart phone that is out of range of a WiFi signal when the source device initiated a communication session with the destination device over the Cellular communication channel at the particular time. When the destination device is in range of the WiFi network and the connection is strong enough to send a ping message to the IDS server 120 using WiFi capability, a process executing on the destination device can initiate step 311. As a similar example, the destination device can wait until it is in range of a signal such as from a cellular network before performing step 311.

Subsequently, at step 312, the destination device establishes a connection with the IDS server 120. In this respect, the process 300 proceeds to step 209, where the IDS server 120 sends the stored notification message to the destination device over the second communication channel.

Subsequently, at step 313, the destination device receives the notification message from the IDS server 120, indicating that the source device initiated a communication session with the destination device via the cellular network equipment 108 at the particular time. For example, the destination device, such as the electronic device 102A, may receive a signal from the IDS server 120 that contains a notification message indicating that a source device, such as the electronic device 102C, initiated a communication session with the electronic device 102A over a cellular communication channel at a particular time. In some implementations, the electronic device 102A may utilize a pre-shared secret between the electronic device 102A and the electronic device 102C, to decode the received message and obtain the missed communication notification. The electronic device 102A may obtain open text metadata from the decoded message, and utilize a rendering process to provide the missed communication notification for display. In some implementations, the message may be forwarded to the electronic device 102B if the electronic device 102B is tethered to the electronic device 102A via a wireless network connection such as a Bluetooth connection.

In some implementations, the electronic device 102A may determine whether to display or purge the decoded message based on one or more heuristics. If the electronic device 102A decides to proceed with displaying an indication of the missed communication notification based on the one or more heuristics, then the contents of the decoded message may be provided for display via a display of the electronic device 102A. If the electronic device 102A decides not to proceed with displaying the indication of the missed communication notification based on the one or more heuristics, then the electronic device 102A purges the decoded message and the message is not displayed. In some examples, the heuristics may include, among others, trusted sender information, a recent communication timestamp, number of instances of the message, status of communication session, user availability of the intended recipient device, signal strength indication, level of urgency or priority, read receipt history. For example, the electronic device 102A may determine that the decoded message originated from a trusted sender (e.g., parent, teacher, legal guardian, etc.), and is marked with high urgency, and therefore, the electronic device 102A determines that the missed communication notification should be displayed on the electronic device 102A. In another example, the electronic device 102A may determine that multiple instances of the same decoded message have been received by the electronic device 102A within a predetermined time period and at least one message was acknowledged by the user of the electronic device 102, and therefore, the electronic device 102A purges the decoded message and the message is not displayed.

In some aspects, the electronic device 102A may display one or more prompts concurrently with the decoded message. In some implementations, the one or more prompts may disable (or lock) a user interface of the electronic device 102A until a user of the electronic device 102A acknowledges and/or accepts the received missed communication notification via the one or more prompts.

In one or more implementations, the push notification messaging service provided by the IDS server 120 may be used in reverse to notify a source device that the intended recipient device actively declined an incoming communication from the source device, such as a phone call. For example, if the electronic device 102A initiates a communication, such as a cellular phone call, with the electronic device 102C via the cellular network equipment 108, and the user of the electronic device 102C actively declines the communication, such as by selecting a user interface element for declining the communication or by otherwise expressly indicating an intent to decline the communication, the electronic device 102C may automatically, and without user input, transmit a message to the electronic device 102A via the IDS server 120 indicating that the attempted communication was actively declined on the electronic device 102C.

In one or more implementations, the electronic device 102C may automatically and without user input transmit the declined call notification when the electronic device 102C includes a list of trusted users (e.g., parents, babysitter, school, etc.), and the user of the calling electronic device 102A is on the list of trusted users.

Figure 4:
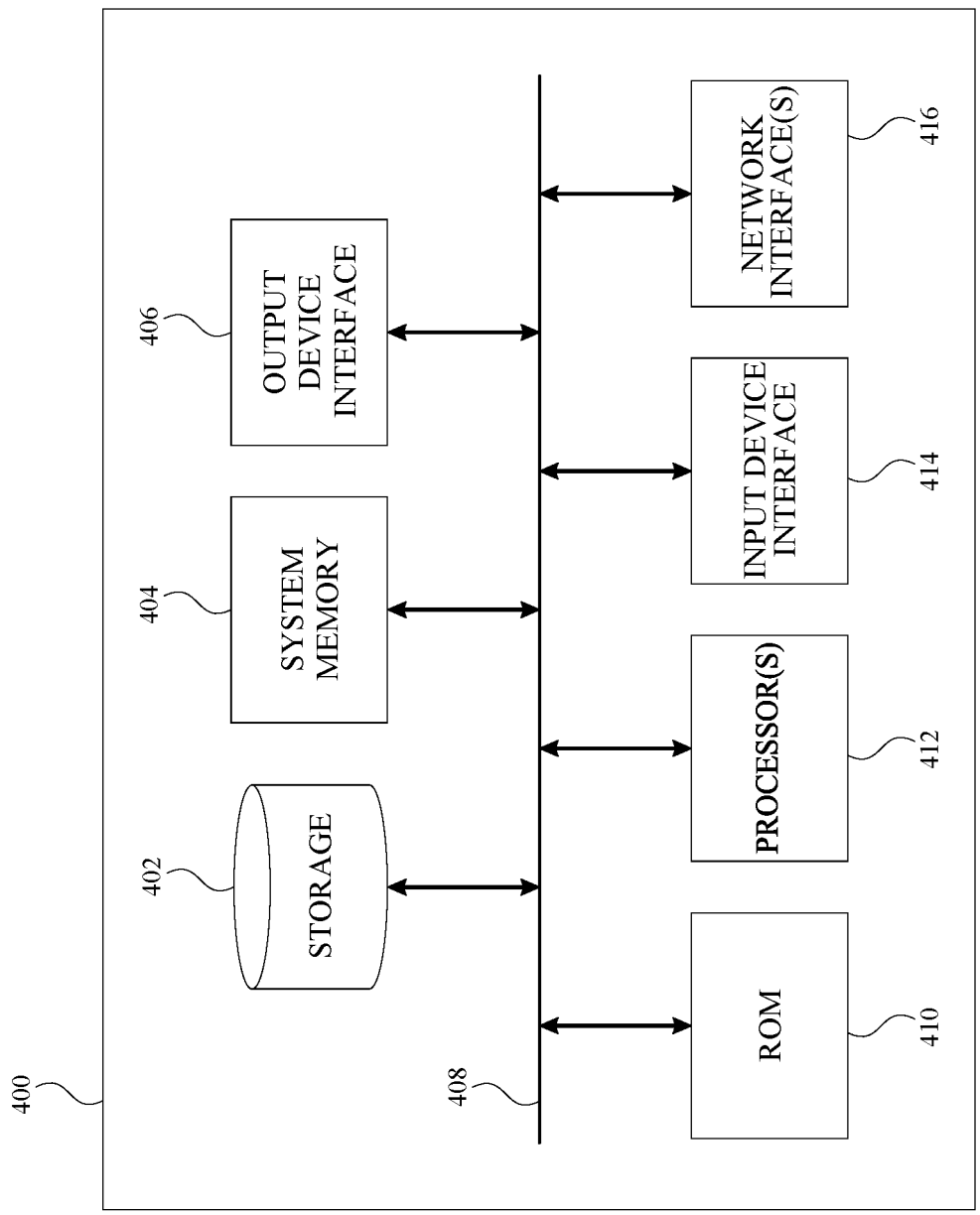
FIG. 4 illustrates an electronic system with which one or more implementations of the subject technology may be implemented.

FIG. 4 illustrates an electronic system 400 with which one or more implementations of the subject technology may be implemented. The electronic system 400 can be, and/or can be a part of, the electronic devices 102A-C as shown in FIG. 1, the IDS server 120, and/or the IDMS server 122 as shown in FIG. 1. The electronic system 400 may include various types of computer readable media and interfaces for various other types of computer readable media. The electronic system 400 includes a bus 408, one or more processing unit(s) 412, a system memory 404 (and/or buffer), a ROM 410, a permanent storage device 402, an input device interface 414, an output device interface 406, and one or more network interfaces 416, or subsets and variations thereof.

The bus 408 collectively represents all system, peripheral, and chipset buses that communicatively connect the numerous internal devices of the electronic system 400. In one or more implementations, the bus 408 communicatively connects the one or more processing unit(s) 412 with the ROM 410, the system memory 404, and the permanent storage device 402. From these various memory units, the one or more processing unit(s) 412 retrieves instructions to execute and data to process in order to execute the processes of the subject disclosure. The one or more processing unit(s) 412 can be a single processor or a multi-core processor in different implementations.

The ROM 410 stores static data and instructions that are needed by the one or more processing unit(s) 412 and other modules of the electronic system 400. The permanent storage device 402, on the other hand, may be a read-and-write memory device. The permanent storage device 402 may be a non-volatile memory unit that stores instructions and data even when the electronic system 400 is off. In one or more implementations, a mass-storage device (such as a magnetic or optical disk and its corresponding disk drive) may be used as the permanent storage device 402.

In one or more implementations, a removable storage device (such as a floppy disk, flash drive, and its corresponding disk drive) may be used as the permanent storage device 402. Like the permanent storage device 402, the system memory 404 may be a read-and-write memory device. However, unlike the permanent storage device 402, the system memory 404 may be a volatile read-and-write memory, such as random access memory. The system memory 404 may store any of the instructions and data that one or more processing unit(s) 412 may need at runtime. In one or more implementations, the processes of the subject disclosure are stored in the system memory 404, the permanent storage device 402, and/or the ROM 410. From these various memory units, the one or more processing unit(s) 412 retrieves instructions to execute and data to process in order to execute the processes of one or more implementations.

The bus 408 also connects to the input and output device interfaces 414 and 406. The input device interface 414 enables a user to communicate information and select commands to the electronic system 400. Input devices that may be used with the input device interface 414 may include, for example, alphanumeric keyboards and pointing devices (also called "cursor control devices"). The output device interface 406 may enable, for example, the display of images generated by electronic system 400. Output devices that may be used with the output device interface 406 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 4, the bus 408 also couples the electronic system 400 to one or more networks and/or to one or more network nodes, such as the electronic device 110 shown in FIG. 1, through the one or more network interface (s) 416. In this manner, the electronic system 400 can be a part of a network of computers (such as a LAN, a wide area network ("WAN"), or an Intranet, or a network of networks, such as the Internet. Any or all components of the electronic system 400 can be used in conjunction with the subject disclosure.

As described above, one aspect of the present technology is the gathering and use of data available from specific and legitimate sources to improve missed communication notifications. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to determine whether to provide a missed communication notification in accordance with a user's preferences. Accordingly, use of such personal information data enables users to have greater control of the devices for which missed communication notifications are enabled. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of missed communication notifications, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, missed communication notifications can be provided based on aggregated non-personal information data or a bare minimum amount of personal information, such as the information being handled only on the user's device or other non-personal information available.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
receiving, at a first device and from a server over a first communication channel, a message indicating that a second device initiated a communication with the first device over a second communication channel at a particular time, the message being received irrespective of whether a connection for the communication was established by the first device with the second device;
determining, by the first device, whether the connection for the communication was established by the first device with the second device over the second communication channel at the particular time;
providing, for display by the first device, an indication of the message based at least in part on a determination, by the first device, that the connection for the communication initiated by the second device was not established over the second communication channel at the particular time; and
foregoing the providing for display by the first device based at least in part on another determination, by the first device, that the connection for the communication initiated by the second device was established over the second communication channel at the particular time.

2. The method of claim 1, further comprising:
discarding the message responsive to the other determination that the connection for the communication initiated by the second device was established with the first device over the second communication channel at the particular time.

3. The method of claim 1, further comprising:
discarding the message responsive to another determination that another connection for another communication was established between the first device and the second device over the second communication channel after the particular time.

4. The method of claim 1, further comprising:
sending, to the second device via the server, another message when the initiated communication was received by the first device and declined by the first device.

5. The method of claim 1, wherein the communication comprises a cellular call, the second communication channel comprises a cellular communication channel, and the first communication channel differs from the second communication channel.

6. The method of claim 1, wherein the message is generated at the second device and the message is end-to-end encrypted between the second device and the first device.

7. The method of claim 1, wherein the message indicates the particular time that the second device initiated the communication with the first device over the second communication channel.

8. The method of claim 1, wherein the message is transmitted to the server based at least on a contact list associated with the first device, the contact list including an identifier of a user associated with the second device.

9. The method of claim 1, further comprising:
transmitting, by the first device, to the server, another message indicating that the first device has at least a data connection to a network,
wherein the message from the server is sent to the first device following the transmitted another message.

10. The method of claim 9, wherein the network comprises at least one of a cellular network or a wireless local area network.

11. A device comprising:
a memory; and
at least one processor configured to:
receive, from a server over a first communication channel, a message indicating that another device initiated a connection for a communication with the device over a second communication channel at a particular time, the message being received irrespective of whether the connection for the communication was established by the first device with the second device;
determine whether the connection for the communication was established with the other device over the second communication channel at the particular time; and
provide, for display, an indication of the message based at least in part on a determination that the connection for the communication initiated by the other device was not established over the second communication channel at the particular time.

12. The device of claim 11, wherein the at least one processor is further configured to:
discard the message responsive to another determination that the connection for the communication initiated by the other device was established with the device over the second communication channel at the particular time.

13. The device of claim 11, wherein the at least one processor is further configured to:
discard the message responsive to another determination that another connection for another communication was established between the device and the other device over the second communication channel after the particular time.

14. The device of claim 11, wherein the at least one processor is further configured to:
receive a communication request to accept the initiated communication over the second communication channel at the particular time;
decline the communication request; and
send, to the other device via the server, another message over the first communication channel when the initiated communication was received by the device and declined by the device.

15. The device of claim 11, wherein the communication comprises a cellular call, the second communication channel comprises a cellular communication channel, and the first communication channel differs from the second communication channel.

16. The device of claim 11, wherein the message is generated at the other device and the message is end-to-end encrypted between the other device and the device.

17. The device of claim 11, wherein the message indicates the particular time that the other device initiated the communication with the device over the second communication channel.

18. The device of claim 11, wherein the message is transmitted to the server based at least on a contact list associated with the device, the contact list including an identifier of a user associated with the other device.

19. The device of claim 11, wherein the at least one processor is further configured to:
transmit, to the server, another message indicating that the device has at least a data connection to a network,
wherein the message is received in response to the transmitted another message.

20. A non-transitory computer-readable medium comprising instructions, which when executed by a computing device, cause the computing device to perform operations comprising:
receiving, at a first device and from a server over a first communication channel, a message indicating that a second device initiated a communication with the first device over a second communication channel at a particular time, the message being received irrespective of whether a connection for the communication was established by the first device with the second device;
determining, by the first device, whether the connection for the communication was established with the second device over the second communication channel at the particular time; and
providing, for display, an indication of the message based at least in part on a determination that the connection for the communication initiated by the second device was not established over the second communication channel at the particular time.

* * * * *